June 4, 1957  P. R. CELMER, JR  2,794,945
MOTOR CONTROL SYSTEM
Filed Oct. 28, 1954
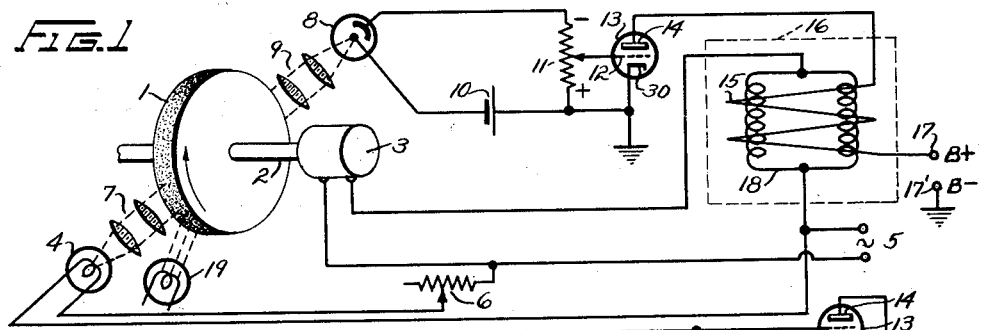
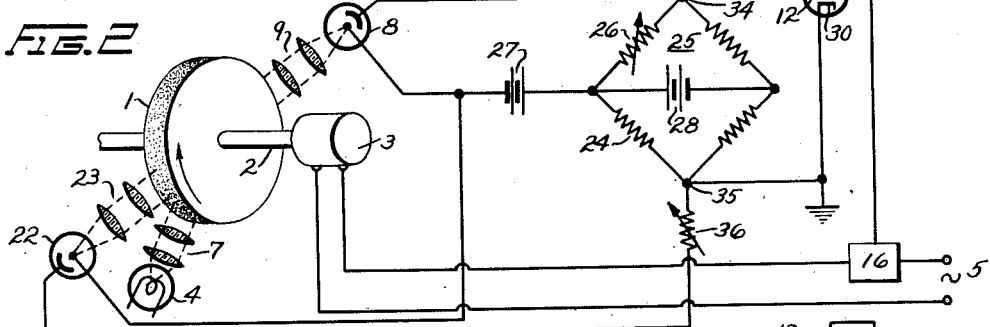
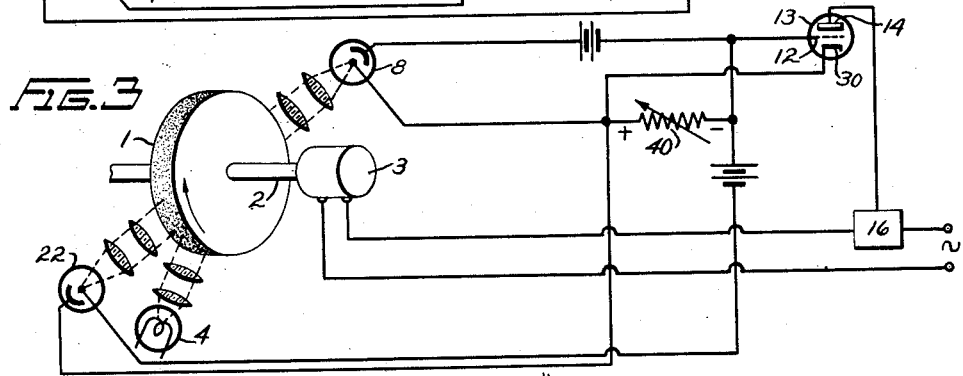
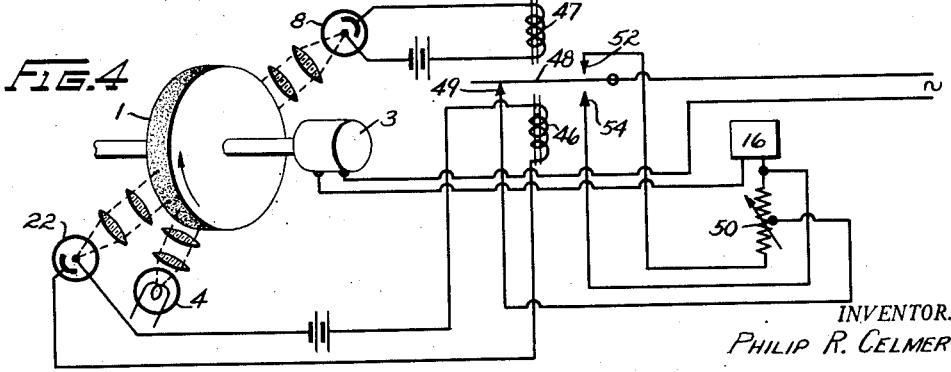
INVENTOR.
PHILIP R. CELMER, JR.
BY Charles H. Brown
ATTORNEY

United States Patent Office 2,794,945
Patented June 4, 1957

2,794,945

MOTOR CONTROL SYSTEM

Philip R. Celmer, Jr., Trenton, N. J., assignor to Radio Corporation of America, a corporation of Delaware Application October 28, 1954, Serial No. 465,263

21 Claims. (Cl. 318—309)

My invention relates to electric control systems and more particularly to a method of and apparatus for controlling the speed of machines while in operation.

Among the objects of my invention are: To detect a change in the speed of operating machinery and to produce a signal in accordance with such a change, the signal being utilized to control the operating speed of the machinery; to provide an improved speed control system for motor driven machinery that will be highly sensitive and effective over a long period of time; to compensate for temperature, aging and other changes in the elements of the control system in a simplified manner; to provide a motor control system in which physical contact with a moving component of the motor driven machinery is not required; and to control the speed of machines while in operation.

In general, I accomplish my objects by coating a surface of a disc or other component of a machine with a substance sensitive to radiant energy, for example, a phosphor, the component being operated as a function of the machine whose speed or driving frequency is to be controlled. The coating substance used is of the luminescent type which, being sensitive to radiant energy, stores such energy, gradually releasing it thereafter at a decreasing rate whereby a sensing or detecting means may be used to detect the presence of the released energy. At one point in a cycle of operation of the component used, the substance is energized by radiations from a source of radiant energy. At another point in the cycle a detector sensitive to luminescence radiation is positioned so as to sense the energy radiated from the substance on the component. The strength of the energy radiated at the position of the detector will therefore be dependent on the time interval necessary for a given point on the disc to pass from the position of the source of energy to the position of detection. The detector transposes the strength of the radiations into a control signal which will be proportional in degree thereto. As the strength of the radiations is proportional to the time interval between the point of energization and that of detection, it may readily be seen that the amplitude of the control signal will be proportional to the time interval and therefore to the speed of the component utilized, inasmuch as the time interval will be determined by the speed of the component. Any change in the speed of the component will bring about a corresponding change in the amplitude of the control signal. The control signal is utilized to control the speed of the driving motor and, therefore, of the machinery of which the component is a part to vary the speed of the motor in the proper sense to bring the machinery back to the desired speed of operation.

The invention is particularly advantageous when used in apparatus requiring close speed regulation, smooth acceleration and precise control of speed without physical contact with the moving object. Such requirements are found, for example, in sound systems such as magnetic recorders where it is necessary to maintain constant linear velocity of a tape or wire in order to attenuate variations of the recorded sound from the correct values.

The novel features which I believe to be chracteristic of my method and systems are set forth in the appended claims, but the invention will be best understood by reference to the following description taken in conjunction with the accompanying drawing in which like reference numerals refer to like parts and in which:

Figure 1 represents diagrammatically an embodiment of my invention using an electric motor drive and a saturable core reactor in the control circuit;

Figure 2 represents diagrammatically a modified pickup arrangement using a form of Wheatstone bridge;

Figure 3 represents diagrammatically a different embodiment of the invention using two pickup cells;

Figure 4 represents diagrammatically still another embodiment of the invention using two pickup cells and a relay arrangement in the control circuit.

Referring to Figure 1, the component utilized for deriving a control signal has been shown as a disc 1. The disc is driven by a shaft 2 which, in turn, is driven by a motor 3 whose speed is to be controlled, the disc being driven in a clockwise direction as indicated by the arrow. It is to be understood that shaft 2 will also serve as a driving means for machinery not shown. A source of radiant energy 4 which may, for example, be white or ultra-violet light, is energized from a suitable voltage source, not shown, supplied to terminals 5. The radiant energy source 4 is connected to terminals 5 thru a variable resistor 6. One surface of the disc 1, shown for purposes of illustration as the edge of the disc, is coated with a luminescent substance such as a phosphor, which will store energy as a result of being exposed to the source of radiant energy source 4. The radiant energy emanating from the source of radiant energy 4 is focused thru a lens system 7 onto the edge of the disc. In order that the edge of the disc 1 receive a uniform amount of energization regardless of the speed of rotation of the disc, the source 4 should be of sufficient intensity to saturate the coating substance at the fastest speed of rotation for which the system is designed to operate. As an additional refinement, the lens system 7 may focus radiations from source 4 in the form of a narrow slit extending axially across the edge of the disc.

The substance used as a coating is of the type such as a phosphorescent material that will gradually release the stored energy at a decreasing rate in the form of radiations. A radiant energy detector, for example, a photocell 8, is positioned at a point removed from the point of energization by source 4 in the cycle of rotation of the disc 1, so as to sense radiations from the substance coating the surface of the disc thru a lens system 9. A further means 19, such as a source of infra-red light, may be used to completely remove (erase) any energy from the coating substance before it is again energized by source 4. The means 19 is of the type which will emit radiations which cancel or erase any energy remaining in the substance coating the edge of the disc. Thus all points of the disc passing the energizing source 4 will receive a constant and uniform amount of energization.

A battery 10 in series with a potentiometer 11 serves to supply a biasing voltage to the photocell 8.

One means of utilizing this arrangement to control the speed of the motor 3 is shown in Figure 1. An electron discharge device 13, illustrated as a vacuum tube, having an electron emitting electrode or cathode 30, an electron collecting electrode or plate 14, and a control electrode or grid 12, has its grid-cathode circuit connected between the adjustable tap and one end of the resistor 11. In addition there is provided as a control element, a saturable core reactor 16 having a direct current saturating winding 15 and an alternating current winding 18 of the type wherein the impedance thereof is determined in inverse relationship to the amplitude of the current flow in the direct current winding. The impedance of the reactor serves to control the amount of current flow thru the second or alternating current winding. Therefore, by regulating the flow of direct current thru the first winding, the amplitude of the alternating current thru the second winding may be controlled. The direct current winding 15 has one end connected to a source of direct current by means of terminal 17 and the other end to the anode 14 of vacuum tube 13. The cathode 30 of vacuum tube 13 and the terminal 17 are shown grounded to provide a return path to the source of direct current. The alternating current winding 18 of the reactor is connected in series with the field windings of motor 3 across terminals 5.

In the operation of this particular embodiment of my invention, the source of radiant energy 4 is positioned in proximity to the disc so that it will energize the coating on the disc 1. The photocell detector 8 is placed so as to sense radiations from the substance energized by source 4 at another point in the cycle of rotation of the disc. As the disc rotates from the point of energization the energy stored by the substance thereon will be gradually released at a decreasing rate. The strength of the radiations present at the point of detection will therefore depend on the time interval between that point and the point of energization. In normal operation a current flow will be set up in the circuit of photocell 8 in accordance with the strength of the radiations sensed by the photocell. This current flow will produce a voltage drop across resistor 11 in the polarity indicated which will serve as grid bias for tube 13.

By suitably positioning the tap on resistor 11, the bias applied to tube 13 and hence the current flow thru the tube and the saturating winding 15 of reactor 16 may be adjusted to the point where the saturation of the core of the reactor 16 is such that the alternating current voltage supplied to the driving motor 3 is of the proper magnitude to operate the motor at the desired speed.

If, for example, the speed of the motor should increase because of some change in the operation of the machinery, the time interval between the point of energization and that of detection will be decreased due to the fact that the disc 1 will rotate at a greater rate of speed. Because the time interval is decreased, the strength of the radiations at the point of detection will have increased. The increased strength of radiations will bring about a decrease in the resistance of photocell 8. As the resistance of the photocell 8 decreases, the current flowing thru the circuit of the photocell and therefore resistor 11 will increase. An increase in the voltage drop across resistor 11 will result which will be of the polarity shown in Figure 1. As a result, the grid 12 of the tube 13 will become more negative thus decreasing the plate current flow. This change of plate current flow is readily adaptable to control arrangements involving saturable core reactors. As the current flow thru the direct current winding 15 of the reactor 16 decreases, due to the decrease in plate current of tube 13, the impedance of the reactor will increase, the amplitude of the alternating current flow to the motor will decrease and the motor will decelerate.

Similarly, if the speed of the motor decreases, the resistance of photocell 8 will increase due to the decrease in the strength of radiations present at the point of detection. This result is brought about by an increase in the time interval between the point of energization and that of detection due to the decrease in the speed of rotation of the disc 1. The increase in resistance of photocell 8 will bring about a decrease in the voltage drop across resistor 11 due to the decreased current flow in the circuit of photocell 8. The decreased voltage drop across the resistor will result in the grid 12 of tube 13 become less negative. The current flow thru the tube will increase and the increased plate current will be applied to the direct current winding 15 of the reactor 16. The impedance of the reactor 16 will decrease and the alternating current flow to the motor will increase causing the motor to accelerate. Thus, it will be seen that an effective means has been provided for maintaining the speed of the motor at the desired rate.

Another embodiment of my invention, utilizing means to compensate for temperature variations or the aging of circuit components, is shown in Figure 2. In addition to the source of radiant energy 4 and detection means 8, discussed in connection with Figure 1, a second detection means 22 with a lens system 23 is disposed in proximity to the source 4 at a point removed from the direction of rotation of the disc 1, shown for purposes of illustration as being clockwise. Photocell 8 is connected across one arm 26 of a Wheatstone bridge 25, and photocell 22 is connected across an arm 24 of the same bridge. A voltage supply 27 is provided for biasing the two photocells. A second voltage supply 28 is placed across one diagonal of the bridge and the other diagonal is connected between the grid 12 and the cathode 30 of the vacuum tube 13. The plate 14 of the vacuum tube 13 may be connected to the motor by means of any suitable control mechanism 16. A saturable core reactor, as shown in Figure 1, may be used for mechanism 16.

In the operation of the particular application of my invention shown in Figure 2, a current will be produced in the circuit of photocell 22 in direct relationship to the strength of the radiations sensed from the irradiating substance which coats a surface of the disc 1. The current flow thus produced will cause a voltage drop across the arm 24 of the bridge 25. The photocell 8 detects the radiation from the coating substance at a point further along the cycle of rotation of the disc and the current flow produced in its circuit will cause a voltage drop across arm 26 of the bridge. By adjusting resistor 26, the bridge 25 may be set for a particular speed of operation of the motor 3. At the correct speed, the voltages appearing across resistors 24 and 26 will be of a value such that the voltage appearing across the terminals 34 and 35 will be of the proper magnitude and polarity to provide a desired bias on the grid of tube 13. As the speed of the motor changes in either direction, the strength of the emanations from the coating material on the disc 1, as sensed by the photocells, will change due to the decay characteristics of the coating material, whereby the material gradually releases the energy stored over a time interval. Such change will vary directly with the variations in the speed of the motor.

For example, if the motor deaccelerates, the strength of the radiations from a given point on the disc exciting photocell 8, as compared with the strength of the radiations from the same point on the disc which has excited photocell 22 will be of proportionally smaller value than are present at the desired speed. This is due to the fact that the time interval within which the energized coating of the disc may decay has been increased. The decay will be greater than that existing during the usual operation of the component. The voltages appearing across arms 24 and 26 of the bridge 25 will be unequal in value due to the decrease in the voltage drop across the arm 26 brought about by a decrease in the current flowing in the circuit of photocell 8. The voltage appearing across the terminals 34 and 35 of the bridge will be altered accordingly. The polarity of the voltage will be such that the grid 12 of tube 13 will be driven less negative. As the bias on the grid is changed, there will be a corresponding increase in the plate current flow to the control mechanism 16. The control mechanism will bring about an increase in the speed of the motor.

Similarly, if the speed of the rotation of the disc increases, the amplitude of the current in the circuit of photocell 8 will increase causing a greater voltage drop across resistor 26. The voltage appearing across terminals 34 and 35 will be such that the grid 12 of the tube 13 will be driven more negative. This will decrease the current flow thru tube 13 and therefore the amplitude of the current fed to the control means 16. The control means, in accordance with the decrease in current thereto, will decrease the current supplied to the motor 3 and thereby bring about a deacceleration.

As the photosensitive material placed on the surface of the disc 1 will undergo a decay during the cycle of rotation of the disc, it may be necessary to ensure the operating efficiency of the system by placing a compensating resistor 36 in the circuit of photocell 22. The compensating resistor will alter the voltage drop appearing across arm 24 of the bridge so that, while the disc is rotating at a constant speed, the voltages appearing across the resistances 24 and 26 will remain in the desired relationship and the bridge will remain set for a particular speed of operation of the motor. Any variations in the strength of the radiations of the photosensitive material due to aging or natural decay may thus be compensated for by varying the size of the compensating resistance, thereby varying the sensitivity of the sensing means 22.

The circuit of Figure 3 shows another embodiment. The two photocells 8 and 22 are arranged to receive radiations from the energized coating of the disc 1, the coating having been energized by the source 4. The outputs of the photocells 8 and 22 are added to produce a single voltage drop across a resistor 40, the grid 12 of the vacuum tube 13 being connected so as to receive its bias from the resistor 40. The output of the tube is then utilized by any suitable means 16 to vary the speed of the motor 3 in the proper direction.

It is evident from the discussion of Figure 2 that a change in the speed of the motor 3 will alter the operation of the vacuum tube 13, the output of which is used by means of a suitable control means 16 to alter the A. C. input to the motor until the motor is operating at the desired rate of speed. For example, if the motor should accelerate, the strength of the radiations reaching photocell 8 will correspondingly increase. A greater current flow in the circuit of photocell 8 will result. The relationship between the outputs of photocells 8 and 22 across resistor 40 will be such that the voltage drop across resistor 40 will occur in the polarity shown in Figure 3. The grid of the tube 13 will be driven more negative thereby reducing the current flow in the tube. The plate current fed to control means 16 will be reduced and the control means will in turn decrease the current fed to the motor 3 which will deaccelerate.

If the motor deaccelerates then the current flow in the circuit of photocell 8 will decrease and the voltage across resistor 40 will be altered. A voltage drop will occur across the resistor of a polarity such that the grid of tube 13 will be driven more positive, the plate current to control means 16 will increase and the control means will bring about an increase in the current fed to motor 3 so as to accelerate it.

Another variation, shown in Figure 4, makes use of the two photocells 8 and 22 at the point of detection with the output of photocell 22 controlling the operation of a low current relay 46. The output from photocell 8, in turn, controls the operation of a high current relay 47. When the disc 1 is rotating at the desired speed, the spring lever 48, connected at one end to a source of alternating current, will be in the neutral position. The other end of the lever will be connected by means of contact 49 thru a portion of variable resistor 50 to a suitable control means 16. By adjusting the resistance 50, the motor 3 may be set to operate at a desired rate of speed.

It may be seen that when the motor is operating at a desired speed the radiations sensed by photocell 22 will bring about a flow of current in the circuit of that photocell thru relay 46. The photocell 8 will also create a flow of current in its circuit thru relay 47 in accordance with the radiations sensed by that photocell. The photocells 8 and 22 are positioned and the circuit components chosen so that in normal operation the force exerted by relays 47 and 46 will be effectively balanced and the control system will appear as shown in Figure 4.

If the speed of rotation of the motor 3 and therefore that of disc 1 increases, the high current relay 47 is energized due to the fact that the time interval between the point of energization 4 and detection by photocell 8 will have decreased. The increased strength of the radiations present at the point of detection will bring about an increased current flow in the circuit of photocell 8. The increase in current flow thru relay 47 will unbalance the condition between relays 46 and 47, and relay 47 will operate. The spring lever 48 will make contact with contact point 52. All of resistor 50 will be placed in the circuit. Because of the added resistance, the current supplied to control means 16 will decrease and the control means will, in turn, cause the motor to deaccelerate, as desired.

If the speed decreases, the flow of current in the circuit of photocell 8 will decrease due to the decrease in the strength of radiations detected by the photocell. The flow of current in the circuit of photocell 22 being constant due to the proximity of the photocell to the source 4, the force exerted by relay 46 will become greater than that exerted by relay 47 and relay 46 will operate. The lever 48 will make contact with the contact point 54 and all of resistor 50 will be removed from the circuit. The current supplied to the control means 16 will increase due to the decreased resistance and the control means will cause the motor to accelerate the necessary amount.

It may be seen that the strength of the radiations from the energized surface of the disc, as detected by the photocells, will depend on the speed of rotation of the disc. A change in speed will cause one of the two relays to operate. The particular relay operating determines the voltage drop across the resistor 50 which is then used to vary the speed of the motor 3 by the use of any suitable means 16.

While I have shown the use of a control means 16 to control the motor 3, if desired, such means could be omitted and the control signal applied directly to the motor. Further, while the invention has been discussed in connection with a rotating component, any type of moving apparatus having a repetitive cyclic motion may be used. The phosphor may be applied to a portion of a machine having a reciprocating movement rather than a rotative movement or a phosphor coated belt may be used instead of the disc.

What I claim is:

1. A system for automatically controlling the speed of machinery having a movable element whose rate of motion is a function of the speed of said machinery comprising, in combination, a source of radiant energy; a coating on at least one surface of said movable element of the type which stores radiant energy and releases the same as a function of time; means for energizing said coating from said source at one point in its cycle of motion; means for detecting the energy released by said coating at another point in its cycle of motion; and control means operatively associated with said detecting means for regulating the speed of said machinery in accordance with a parameter of the released energy detected by said detecting means.

2. A system as set forth in claim 1, further including means for removing the remaining radiant energy stored in said coating at a time in its cycle of motion between the time the energy released thereby is detected and the time the coating is again reenergized.

3. A system as set forth in claim 1, wherein said coating comprises a phosphorescent material.

4. A system for automatically controlling the speed of machinery while in operation comprising, in combination, a movable element cyclically operated in accordance with the speed of said machinery, a coating on said movable element sensitive to radiant energy, a source of radiant energy, means energizing said coating from said source, the energization imparted to said coating being cyclically dissipated at a gradually decreasing rate in the form of radiant energy, a radiant energy detector spaced from said energizing means and arranged to sense the energy released from said coating, means coupled to said detector for deriving a control signal, and means responsive to said control signal and connected to said machinery for automatically varying the speed thereof in accordance with the amplitude of said control signal.

5. A speed regulating device comprising, in combination, an element cyclically operated whose rate of motion is a function of the speed of a machine to be regulated, a coating of radiant energy sensitive material on a surface thereof, a fixed source of radiant energy located adjacent a point in the cycle of said coated surface and arranged to energize said coating, said coating being of the type which releases the energy imparted to it in the form of emanations of radiant energy at a gradually decreasing rate, a fixed radiant energy detector located adjacent another point in the cycle of movement of said surface and arranged to detect said emanations, means coupled to said detector for generating a control signal proportional in strength to that of said detected emanations, and means utilizing said control signal to maintain the rate of motion of said element uniform.

6. A system for automatically controlling the speed of machinery while in operation comprising, in combination, a source of radiant energy, an element cyclically operated when rate of motion is a function of the speed of said machinery, said element having a surface coated so as to be sensitive to radiant energy, energizing means for energizing said coating from said source, the energization imparted to said coating being dissipated therefrom at a gradually decreasing rate in the form of radiant energy, a detecting means spaced from said energizing means for sensing radiations from said coating, means including said detecting means and a resistor for deriving a control signal, a control means responsive to said control signal and connected to said machinery for automatically varying the speed thereof in accordance with the amplitude of said control signal.

7. In a motor control system, an element connected to and driven by said motor, said element having a surface coated with a material sensitive to radiant energy, a source of radiant energy, energizing means for energizing said coating from said source, the energization imparted to said coating being released therefrom at a gradually decreasing rate, means adjacent said element and spaced from said energizing means for sensing said released energy, means including said sensing means for deriving a control signal, and means responsive to said control signal and connected to said motor for automatically varying the speed thereof in accordance with the amplitude of said control signal.

8. In a motor control system, an element connected to and driven by said motor, said element having a surface coated with a material sensitive to radiant energy, a source of radiant energy, energizing means for energizing said coating from said source, the energization imparted to said coating being released therefrom at a gradually decreasing rate, means spaced from said energizing means for sensing said released energy, means including said sensing means for deriving a control signal, and means responsive to said control signal for regulating the speed of said motor in accordance with the strength of said energy detected by said sensing means.

9. A system for automatically controlling the speed of machinery while in operation comprising, in combination, a source of radiant energy, an element cyclically operated whose rate of motion is a function of the speed of said machinery, a coating on a surface of said element formed of a material sensitive to radiant energy, means energizing said coating from said source at one point in the cycle of operation of said element, the energy imparted to said coating being gradually released therefrom at a decreasing rate in the form of radiant energy, means sensing said released energy at another point in the cycle of operation of said element including a photocell and resistor whereby a control signal is developed across said resistor, means including an electron discharge device and a saturable core reactor responsive to said control signal and connected to said machinery for automatically varying the speed thereof in accordance with the strength of the released energy detected by said sensing means.

10. A system for automatically controlling the speed of machinery while in operation comprising, in combination, an excitation source of radiant energy, an element of said machinery having a surface coated with a material sensitive to radiant energy and whose rate of motion is a function of the speed of said machinery, means energizing said coating from said source, the energization imparted to said surface being gradually dissipated therefrom at a decreasing rate as radiant energy, a first radiant energy sensing means placed adjacent the point of energization of said coated surface and adapted to receive emanations therefrom, a second radiant energy sensing means placed at another point in the cycle of operation of said element and adapted to receive emanations from said coated surface, a resistive bridge network responsive to the signal outputs of said sensing means, said bridge network developing a control signal, and means applying said control signal to said machinery so as to vary the speed of operation thereof in accordance with the amplitude of said control signal.

11. A system for automatically controlling the speed of machinery while in operation comprising, in combination, a source of radiant energy, a disc connected to and driven as a function of said machinery, a surface of said disc having a coating of a material sensitive to radiant energy, means for energizing said coating from said source, the energization imparted to said coated surface being gradually dissipated therefrom at a decreasing rate as radiant energy, a first photocell circuit placed adjacent the point of energization of said coated surface from said source for sensing said dissipating energy, a second photocell circuit placed at another point in the cycle of rotation of said disc for sensing said dissipating energy, a resistive bridge network responsive to the outputs of said photocell circuits, said bridge network developing a control signal in accordance with the amplitude of the output signals from said photocell circuits, and means including an electron discharge device for applying said control signal to the driving means of said machinery for automatically varying the speed of operation in accordance with the amplitude of said control signal.

12. A system for automatically controlling the speed of machinery while in operation comprising, in combination, a source of radiant energy, an element having a surface coated with a material sensitive to radiant energy, means for energizing said surface from said source, the energization imparted to said surface being gradually dissipated therefrom at a decreasing rate as radiant energy, a first and a second sensing means for detecting said radiant energy emanated from said coated surface positioned at predetermined points in the cycle of operation of said element, means for adding the outputs of said sensing means to produce a single control signal, and means for utilizing said control signal for automatically varying the speed of operation of said machinery in relation to the amplitude of said control signal.

13. A system for automatically controlling the speed of machinery while in operation comprising, in combination, a source of radiant energy, a disc connected to and driven as a function of said machinery, a surface of said disc coated with a material sensitive to radiant energy, means for energizing said surface from said source, the energization imparted to said surface being dissipated therefrom gradually at a decreasing rate as radiant energy, a first and a second photocell adapted to receive radiations from said coated surface positioned at predetermined points in a cycle of rotation of said disc, a resistor common to the circuit of both of said photocells whereby the signal outputs from both photocells are added across said resistor to produce a control signal, and means including an electron discharge device for utilizing said control signal for automatically varying the speed of operation of said machinery in accordance with the amplitude of said control signal.

14. A system for controlling the speed of machinery while in operation comprising, in combination, a source of radiant energy, an element whose rate of motion is a function of the speed of said machinery and having a coating sensitive to radiant energy on a surface thereof, means for energizing said coating from said source at one point in the operating cycle of said element, the energization imparted to said coating gradually being released therefrom at a rate which is a function of time in the form of radiant energy, first and second radiant energy sensing means spaced from one another for sensing said released energy at other points in the operating cycle of said element, a high current and a low current relay connected to said first and said second sensing means respectively, a resistance adapted to be inserted or removed from the input circuit to said machinery by the operation of said relays, and a control means interconnecting the said resistance and said machinery whereby the speed of operation of said machinery is automatically controlled by the insertion or removal of said resistance in accordance with the amplitude of the output signals of said sensing means.

15. A system for controlling the speed of machinery while in operation comprising, in combination, a source of radiant energy, a disc rotatably driven as a function of said machinery and having a coating sensitive to radiant energy on a surface thereof, means for energizing said coating from said source at one point in the operating cycle of said element, the energization imparted to said coating gradually being released therefrom at a decreasing rate in the form of radiant energy, first and second photocells spaced from one another for sensing said released energy at other points in the operating cycle of said element, a high current and a low current relay connected so as to be operated by said first and said second photocells respectively, a resistance adapted to be inserted or removed from the input circuit to said machinery by the operation of said relays, and a control means interconnecting the said resistance and said machinery whereby the speed of operation of said machinery is controlled by the insertion or removal of said resistance in accordance with the amplitude of the output signals of said photocells.

16. In an arrangement including a movable element and driving means for cyclically driving said movable element, a system for regulating the driving frequency of said driving means comprising, in combination, storage means on said element for storing energy applied thereto and releasing said stored energy at a rate which is a function of time; means for applying energy to said storage means at one point in said cycle; and regulating means operatively associated with said driving means for controlling the driving frequency thereof including receiving means for receiving the energy released by said storage means at another point in said cycle and responsive to a parameter of said released energy.

17. In an arrangement including a movable element and driving means for cyclically driving said movable element, a system for regulating the driving frequency of said driving means comprising, in combination, a radiant energy sensitive substance on said element of the type which stores radiant energy impinging thereon and reradiates said energy at a rate which is a function of time; means for directing radiant energy at said substance at one point in said cycle; and regulating means operatively associated with said driving means for controlling the driving frequency thereof including receiving means for receiving the energy reradiated from said substance at another point in said cycle and responsive to a parameter of said reradiated energy.

18. In an arrangement including a movable element and driving means for cyclically driving said movable element, a system for regulating the driving frequency of said driving means comprising, in combination, a radiant energy sensitive substance on said element of the type which stores radiant energy impinging thereon and reradiates said enregy at a rate which is a function of time; means for directing radiant energy at said substance at one point in said cycle; and regulating means operatively associated with said driving means for controlling the driving frequency thereof including receiving means for receiving the energy reradiated from said substance at another point in said cycle and responsive to the magnitude of said reradiated energy.

19. In an arrangement as set forth in claim 16, further including means for discharging said storage means at a point in said cycle between the point at which the energy released by said storage means is received, and the point at which said energy is applied to said storage means.

20. In an arrangement as set forth in claim 16, said driving means including an electric motor, and saturable reactor means including a bias winding in the circuit of said motor, said regulating means including means for varying the bias voltage applied to said bias winding as a function of the magnitude of said released energy.

21. An arrangement as set forth in claim 16, said storage means comprising a phosphor, and said means for applying energy comprising a source of light.

References Cited in the file of this patent

UNITED STATES PATENTS

| | | |
|---|---|---|
| 2,203,352 | Goldmark | June 4, 1940 |
| 2,203,353 | Goldmark | June 4, 1940 |
| 2,455,247 | Crest | Nov. 30, 1948 |
| 2,576,760 | Jones et al. | Nov. 27, 1951 |
| 2,683,813 | Friedman | July 13, 1954 |